(12) United States Patent
Sparschuh et al.

(10) Patent No.: US 7,718,287 B2
(45) Date of Patent: May 18, 2010

(54) COMPACT ANODE FLOW SHIFT DESIGN FOR SMALL FUEL CELL VEHICLES

(75) Inventors: Jens-Uwe Sparschuh, Nackenheim (DE); Franz Winter, Mainz (DE); Reiner Essinger, Lauteral (DE)

(73) Assignee: GM Global Technology Operations, Inc., Detroit, MI (US)

( * ) Notice: Subject to any disclaimer, the term of this patent is extended or adjusted under 35 U.S.C. 154(b) by 1253 days.

(21) Appl. No.: 11/248,505

(22) Filed: Oct. 12, 2005

(65) Prior Publication Data

US 2007/0082243 A1 Apr. 12, 2007

(51) Int. Cl.
*H01M 8/04* (2006.01)
(52) U.S. Cl. .............................. 429/22; 429/11; 429/13
(58) Field of Classification Search .................... 429/13, 429/11, 22, 34
See application file for complete search history.

(56) References Cited

U.S. PATENT DOCUMENTS

2006/0078768 A1* 4/2006 Pechtold et al. ............... 429/22

* cited by examiner

*Primary Examiner*—Dah-Wei D Yuan
*Assistant Examiner*—Patricia Davis
(74) *Attorney, Agent, or Firm*—John A. Miller; Miller IP Group, PLC

(57) ABSTRACT

An anode inlet unit for a split fuel cell stack or two fuel cell stacks having two anode inlets. The anode inlet unit has particular application for a small vehicle that requires less power. In one embodiment, the anode inlet unit only includes three injectors. Two of the injectors provide flow control for the hydrogen gas to the two anode inlets to provide the desired turn-down ratio. For a split stack design, the two injectors may provide flow-shifting where the injection of hydrogen gas into the sub-stacks is alternated. The other injector injects a small amount of hydrogen into the cathode side of the fuel cell stack at system start-up to quickly increase the operating temperature of the system. Additionally, two valves can be provided in the unit that receive a flow of air to purge the anode side of the stack for system shut-down.

8 Claims, 2 Drawing Sheets

COMPACT ANODE FLOW SHIFT DESIGN FOR SMALL FUEL CELL VEHICLES

BACKGROUND OF THE INVENTION

1. Field of the Invention

This invention relates generally to an anode inlet unit for a fuel cell system and, more particularly, to an anode inlet unit for fuel cell systems including a small fuel cell stack for a small vehicle, where the anode inlet unit employs three injectors and two purge valves.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Several fuel cells are typically combined in a fuel cell stack to generate the desired power. For the automotive fuel cell stack mentioned above, the stack may include two hundred or more cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

Flow control pressure regulators are typically employed in fuel cell systems at various locations to provide a desired gas flow rate. For example, flow control pressure regulators are typically employed at the anode inlet of the fuel cell stack to provide a desired pressure reduction and hydrogen gas flow rate for hydrogen gas from a hydrogen pressure storage tank, or other hydrogen storage device.

Solenoid-controlled valves or injectors usually provide pressure regulation and flow control in a fuel cell system. An injector is a 2/2-way valve that switches between a fully opened and a fully closed position at a particular frequency and duty cycle. The frequency determines the time of each switching cycle of the injector, and the duty cycle determines how long the injector is open and closed per cycle, where the ratio of time between the open and closed position of the injector is its duty cycle. An injector can be operated at a constant frequency. However, for low duty cycles, it may be desirable to decrease the frequency because low duty cycles can be adjusted more precisely at low frequencies to increase the injector's turn-down ratio, where the turn-down ration is the ratio of the pressure an the inlet of the valve to the pressure at the outlet of the valve.

Proportional valves are typically not the most desirable for the anode inlet to a fuel cell system because they have a hysteresis that affects fuel cell system operation by making pressure regulation and flow rate more difficult. Also, proportional valves have a low turn-down ratio (1:10). Injectors are usually more desirable because they typically have a large turn-down ratio (1:20) and no hysteresis. In an injector, the flow rate is proportional to the duty cycle of the injector. The opening frequency of the injector can be selected to provide the desired turn-down ratio, where low frequencies are typically required for small flow rates and high turn-down ratios.

Typically, the various flow control valves and injectors for the anode side of a fuel cell stack are part of an anode inlet unit (AIU) that controls the hydrogen gas flow to the anode side of the fuel cell stack. It is typically desirable to make the anode inlet unit as small, lightweight and inexpensive as possible, especially for small vehicles that may employ short stacks. Therefore, it is desirable to reduce the number of valves, pipes, hoses, brackets, fittings, etc. in the anode inlet unit.

SUMMARY OF THE INVENTION

In accordance with the teachings of the present invention, an anode inlet unit for a split fuel cell stack or two fuel cell stacks having two anode inlets is disclosed. The anode inlet unit has particular application for a small vehicle that requires less power. In one embodiment, the anode inlet unit only includes three injectors, or flow regulation valves. Two of the injectors or flow regulation valves provide flow control for the hydrogen gas at the two anode inlets with the desired turn-down ratio. For a split stack design, the two injectors may provide flow-shifting where the injection of hydrogen gas into the sub-stacks is alternated. The other injector, or flow regulation valve, injects a small amount of hydrogen into the cathode side of the fuel cell stack at system start-up to quickly increase the operating temperature of the system. Two other valves can be provided in the unit to direct a flow of air to the anode side of the stack when no hydrogen is flowing to purge the anode, for example, at system shut-down.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an anode inlet unit for a fuel cell system is merely exemplary in nature, and is in no way intended to limit the invention or its applications or uses. For example, the anode inlet unit of the invention has particular application for a small vehicle having a small split fuel cell stack or two small fuel cell stacks. However, as will be appreciated by those skilled in the art, the anode inlet unit of the invention may have application for other fuel cell systems.

Figure 1:
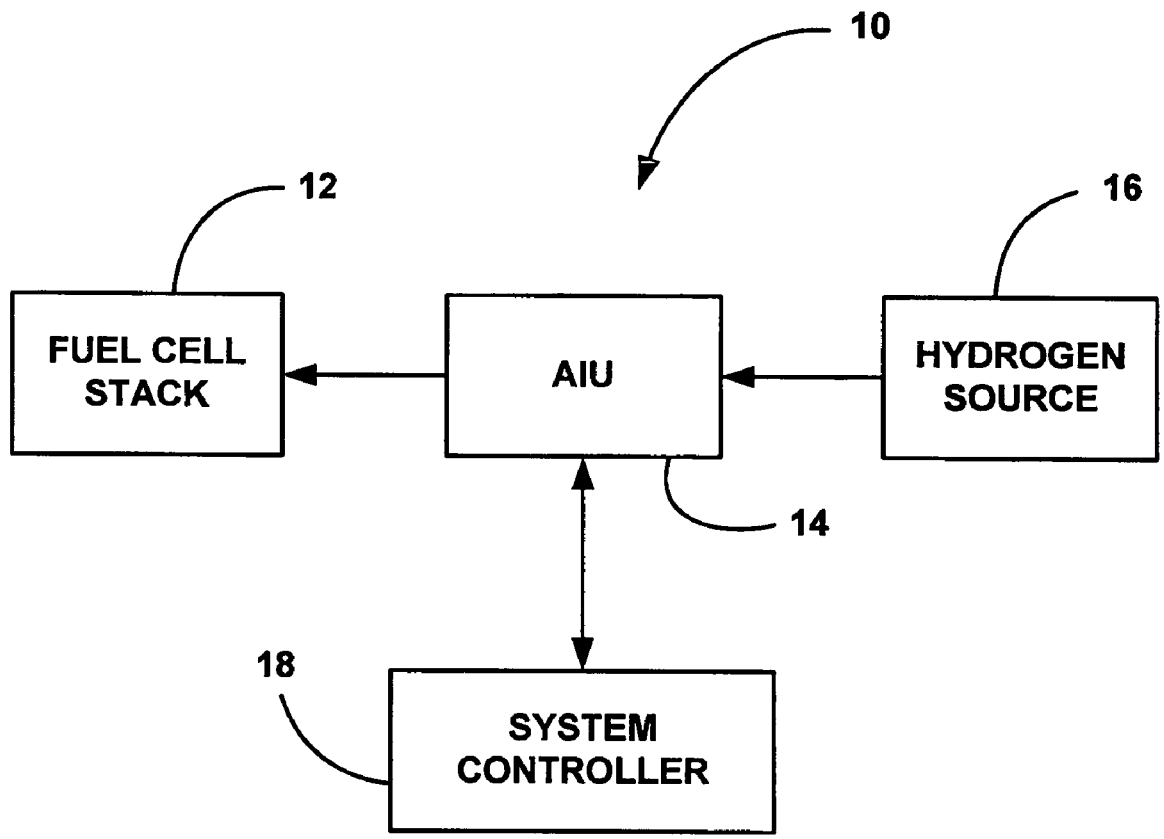
FIG. 1 is a block diagram of a fuel cell system including an anode inlet unit, according to an embodiment of the present invention.

FIG. 1 is a block diagram of a fuel cell system 10 including a fuel cell stack 12, according to an embodiment of the present invention. An anode inlet unit (AIU) 14, discussed in detail below, controls the pressure and flow rate of hydrogen gas from a compressed hydrogen storage tank 16, or other suitable storage device, to the anode input of the fuel cell stack 12. A system controller 18 controls the anode inlet unit 14, and other system components, consistent with the discussion herein. In this embodiment, the system controller 18 controls more than the anode inlet unit 14. However, a separate controller (not shown) in the anode inlet unit 14 may be required to control the various valves and other components in the anode inlet unit 14, as will be discussed below.

Figure 2:
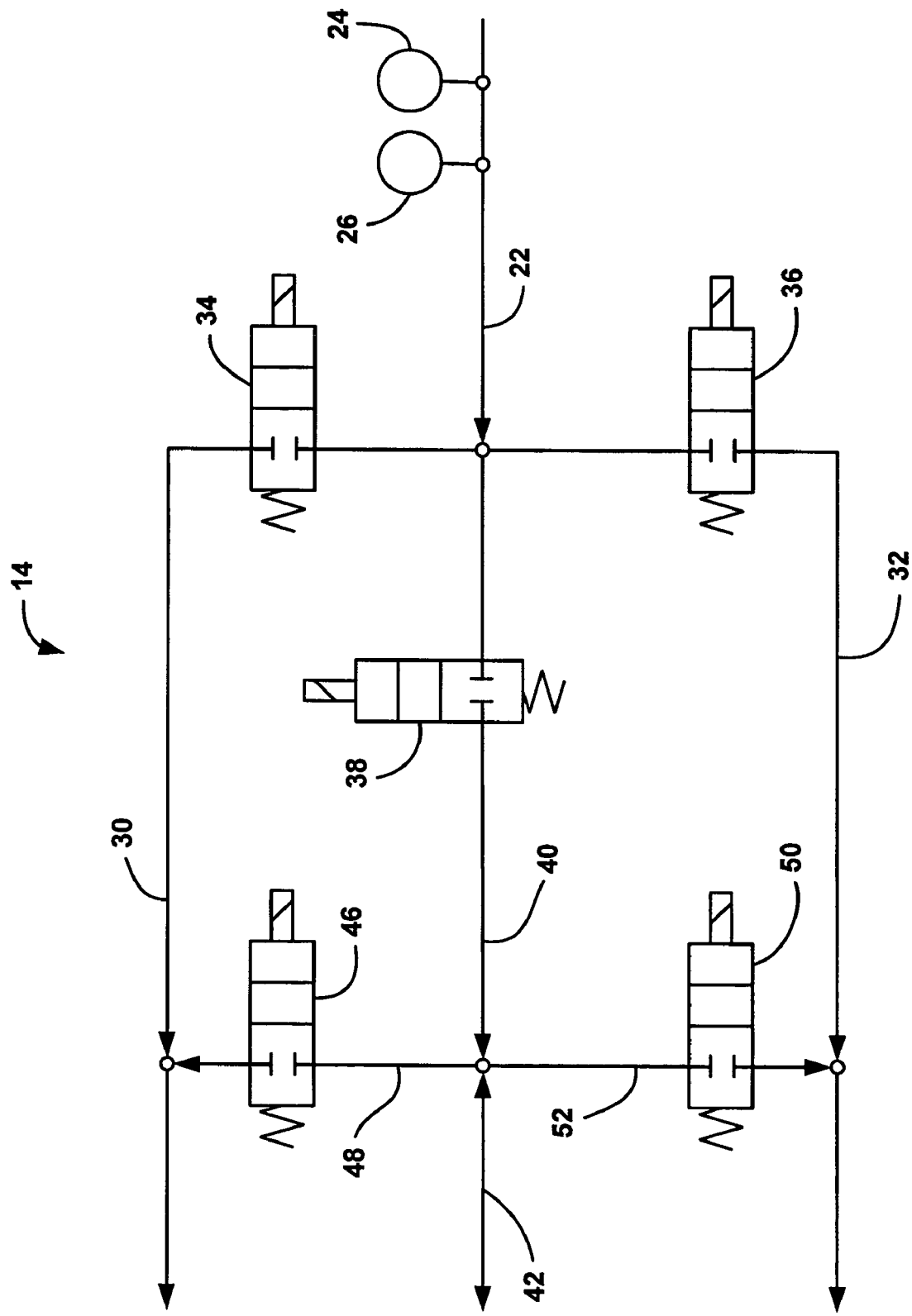
FIG. 2 is a schematic diagram of the anode inlet unit shown in FIG. 1.

FIG. 2 is a schematic diagram of the anode inlet unit 14. Hydrogen gas from the hydrogen storage tank 16 is provided to the anode inlet unit 14 on line 22. An optional pressure transducer 24 measures the pressure of the hydrogen gas in the line 22 and an optional temperature sensor 26 measures the temperature of the hydrogen gas in the line 22. In certain fuel cell system designs, the pressure transducer 24 and the temperature sensor 26 may be required for proper system operation. However, in other designs, the pressure transducer 24 and the temperature sensor 26 may not be needed, and therefore can be deleted from the anode inlet unit 14, further saving space, weight and cost.

In this embodiment, the fuel cell stack 12 is a split stack, well known to those skilled in the art, that includes two anode inputs. Particularly, the anode inlet line 22 feeds a first anode input line 30 and a second anode input line 32, where the line 30 provides the hydrogen gas to an anode input for one sub-stack of the split stack 12 and the line 32 provides the hydrogen gas to an anode input for another sub-stack of the split stack 12. As is known in the art, split stacks are sometimes used because it is difficult to effectively provide an equal flow of hydrogen gas in parallel through the several fuel cells that may be required in the stack. Further, it is also known in the art to provide anode gas flow-shifting, where the direction of the anode gas flow through the stack 12 is periodically reversed, for example every five seconds, so that the drying effect of the membrane caused by the dry hydrogen gas flow at the anode inlet does not continually happen at one end of the stack 12. Further, by providing flow-shifting, the water produced by the stack is better used to provide humidification of the membrane.

An injector 34 is provided in the anode input line 30 and an injector 36 is provided in the anode input line 32 to control the flow rate of the hydrogen gas to the two anode inlets. The injectors 34 and 36 can be any suitable injectors for the purposes described herein that provide the desired turn-down ratio at the proper pressure. The system controller 18, or AIU controller, controls the operation of the injectors 34 and 36 so that they are properly sequenced to inject the hydrogen gas into the two anode inlets of the fuel cell stack 12 in the desired manner. In this embodiment, the fuel cell system 10 is smaller than other fuel cell systems because the amount of power required is less, and thus, only a single injector is required to provide the desired flow rate of hydrogen and turn-down ratio for the anode of the stack 12. Particularly, less hydrogen is required for a fuel cell system in a small vehicle to provide the desired power. Larger fuel cell systems are required for larger vehicles, which may require more injectors to provide the turn-down ratio that is necessary.

In certain fuel cell system designs, a small amount of hydrogen gas is input into the cathode side of the fuel cell stack 12 for cold starts, where the hydrogen gas reacts with the air on the cathode side to generate heat so that the operating temperature of the fuel cell stack 12 can be increased more quickly to a desirable operating temperature. To provide this injection of hydrogen gas in to the cathode side, the anode inlet unit 14 includes a suitable injector 38 that controls the flow of hydrogen gas on a line 40 split from the hydrogen input line 22. The injector 38 is controlled by the system controller 18 so that at start-up, hydrogen gas may be provided on the line 40. The line 40 is coupled to the cathode input of the fuel cell stack 12 on line 42.

Further, at system shut-down, it may be desirable in some fuel cell system designs to purge the anode side of the fuel cell stack 12 to remove the remaining hydrogen gas and water in the flow channels of the anode side of the stack 12. Removing hydrogen gas from the anode side at system shut-down has certain benefits, and removing the water in the flow channels prevents it from freezing in the stack 12 for low temperature environments. A first valve 46, such as a 2/2-way valve, can be provided in a line 48 coupled to the lines 30 and 40 so that air can be selectively directed into the line 30 to purge the first anode inlet to the stack 12 when the flow of hydrogen to the anode side of the stack 12 is shut off. A second valve 50 can be provided in a line 52 coupled to the lines 32 and 40 so that air can be selectively directed into the line 32 to purge the second anode inlet to the stack 12 when the flow of hydrogen to the anode side of the stack 12 is shut off. The purge valves 46 and 50 do not need to be injectors, but can proportional valves that have a lower turn-down ratio and operate at lower flow pressures than injectors. At system shut-down, the system controller 18 will close the valves 34, 36 and 38, and may open the valves 46 and 50 to allow air from the compressor (not shown) to enter the anode inlets through the lines 30 and 32 so that the line 42 is only being used for one purpose at a time.

The design of the anode inlet unit 14 provides an integration of components for a small fuel cell vehicle that reduces packaging space, weight, cost and assembly requirements.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An anode inlet unit for a fuel cell system, said anode inlet unit comprising:
   a hydrogen gas source;
   a hydrogen input line responsive to hydrogen gas from the source;
   a first anode input line coupled to the hydrogen input line;
   a second anode input line coupled to the hydrogen input line;
   a first valve provided in the first anode input line;
   a second valve provided in the second anode input line;
   a cathode input line coupled to the hydrogen input line;
   a third valve provided in the cathode input line;
   a first purge line coupled to the cathode input line and the first anode input line;
   a second purge line coupled to the cathode input line and the second anode input line;
   a fourth valve positioned in the first purge line;
   a fifth valve positioned in the second purge line; and
   a controller for controlling the first, second, third, fourth and fifth valves, said controller selectively opening and closing the first and second valves to provide the hydrogen gas to the first and second anode input lines, selectively opening and closing the third valve to provide the hydrogen gas to a cathode input and selectively opening and closing the fourth and fifth valves to provide air to the first and second anode input lines, wherein the only valves that the anode inlet unit includes is the first, second, third, fourth and fifth valves to provide a compact design for a small vehicle.

2. The anode inlet unit according to claim 1 wherein the first and second anode input lines are anode inlet lines for a split fuel cell stack.

3. The anode inlet unit according to claim 1 wherein the first and second anode input lines are anode inlet lines for separate fuel cell stacks.

4. The anode inlet unit according to claim 1 wherein the first, second and third valves are injectors that are sequentially controlled by the controller to increase or decrease a hydrogen flow rate to the stack.

5. The anode inlet unit according to claim 1 wherein the fourth and fifth valves are electrically controlled purge valves.

6. The anode inlet unit according to claim 1 further comprising a pressure transducer positioned in the hydrogen input line to measure the pressure of the hydrogen gas in the hydrogen input line.

7. The anode inlet unit according to claim 1 further comprising a temperature sensor positioned in the hydrogen input line for measuring the temperature of the hydrogen gas in the hydrogen input line.

8. The anode inlet unit according to claim 1 wherein the fuel cell system is on a small vehicle.

* * * * *